(12) United States Patent
Wirtanen et al.

(10) Patent No.: US 10,841,836 B1
(45) Date of Patent: Nov. 17, 2020

(54) MULTIPLE TELEMATICS UNIT LOAD BALANCING

(71) Applicant: FORD GLOBAL TECHNOLOGIES, LLC, Dearborn, MI (US)

(72) Inventors: Jeffrey William Wirtanen, Kanata (CA); Muhammad Khaledul Islam, Ottawa (CA); Jin Kim, Ottawa (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/423,432

(22) Filed: May 28, 2019

(51) Int. Cl.
*H04W 28/08* (2009.01)
*G07C 5/00* (2006.01)

(52) U.S. Cl.
CPC ............ *H04W 28/08* (2013.01); *G07C 5/008* (2013.01)

(58) Field of Classification Search
CPC ...... H04L 67/12; H04L 67/34; H04L 63/1466
See application file for complete search history.

(56) References Cited

U.S. PATENT DOCUMENTS

| 9,883,481 | B2 | 1/2018 | Park |
| 2005/0065716 | A1 | 3/2005 | Timko et al. |
| 2020/0084741 | A1* | 3/2020 | Chun .................... H04W 12/08 |

* cited by examiner

*Primary Examiner* — Chandrahas B Patel
(74) *Attorney, Agent, or Firm* — Michael Spenner; Brooks Kushman P.C.

(57) ABSTRACT

A vehicle includes a plurality of telematics control units (TCUs) and a processor. The vehicle may use the processor to consider vehicle variables, responsive to a data transfer request, including power usage constraints, data usage over a billing cycle for each carrier associated with a given TCU, and transfer timing requirements for a given data transfer request. Based on the considered variables, the vehicle may select at least one controlling variable and select at least one of the TCUs based on at least a value of the controlling variable, then use the selected TCU to fulfil the data transfer request.

18 Claims, 3 Drawing Sheets

MULTIPLE TELEMATICS UNIT LOAD BALANCING

TECHNICAL FIELD

The illustrative embodiments generally relate to methods and apparatuses for multiple telematics unit load balancing.

BACKGROUND

As vehicle data transfer requirements increase, vehicles need increasing bandwidth to share all information. In certain instances, for example, a vehicle may be provided with two (or more) telematics control units (TCUs). Each TCU may have a different subscription associated therewith, and each may even use a different service provider. As such, each TCU may have a monthly billing cycle and a monthly data limit. Moreover, it may make sense to divide subscriptions between carriers, because certain carriers tend to have better coverage in a given area.

SUMMARY

In a first illustrative embodiment, a vehicle includes a plurality of telematics control units (TCUs), at least two being provided service by different carriers and a processor. The processor is configured to consider vehicle variables, responsive to a data transfer request, including power usage constraints, data usage over a billing cycle for each carrier associated with a given TCU, and transfer timing requirements for a given data transfer request. The processor is also, based on the considered variables, configured to select at least one controlling variable. The processor is further configured to select at least one of the TCUs based on at least a value of the controlling variable and use the selected TCU to fulfil the data transfer request.

In a second illustrative embodiment, a method includes receiving a data transfer request. The method also includes selecting a controlling vehicle variable, from at least: power usage constraints, data usage over a billing cycle for each carrier associated with a given TCU, or transfer timing requirements for the data transfer request.

The selecting may be based on a strategy that selects transfer timing requirements responsive to the data transfer request includes a mandated transfer speed or an indicator of a high-priority request, selects power usage constraints when not selecting transfer timing requirements and responsive to a power usage constraint variable value being below a predefined threshold, and selects data usage over a billing cycle responsive to not selecting either of transfer timing requirements or power usage constraints. The method also includes using one or more telematics control units (TCUs) of a plurality of onboard TCUs for usage to fulfil the data transfer request, the one or more TCUs chosen based on a value associated with the controlling vehicle variable.

In a third illustrative embodiment, a method includes receiving a data transfer request at a vehicle. The method also includes selecting a controlling vehicle variable based on a selection strategy prioritizing data transfer requirements included with the request, over both power usage considerations and data usage, and prioritizing power usage considerations over data usage. The method further includes choosing one or more TCUs from a plurality of available TCUs to fulfil the request, based on a choice strategy associated with a controlling vehicle variable selected based on the selection strategy and using the chosen one or more TCUs to fulfil the request.

DETAILED DESCRIPTION

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Deciding which TCU to use can be a balancing act considering, for example, data costs, signal strength, requisite speed of transfer, etc. For example, carrier A, associated with a first TCU, may have a limited amount of data remaining on a contract, allowing for only 10 Megabytes (Mb) of transfer for the duration of the cycle. At the same time carrier B, associated with a second TCU, may have 250 Mb of data remaining, if 50 Mb of files are to be transferred, it might seem reasonable to simply use carrier B, given the data caps, but that is not always the best choice.

In scenarios where speed is of the issue, it might make sense to use both carriers to maximize transfer speed, regardless of impact on cost (i.e., this will likely result in usage past the cap of carrier A). On the other hand, in scenarios where power preservation is of concern, it may make sense to use a single TCU, having the highest signal strength, even if that TCU uses carrier A, because higher signal strength transfers use less power. There are more complexities than these that may need to be considered, and the illustrative embodiments provide load-balancing and usage determinations for multi-TCU systems that provide optimal speed, cost and power usage, adapting to particulars as they arise (e.g., switching from a cost-saving solution to a power-saving solution dynamically, if power preservation becomes paramount).

Figure 1:
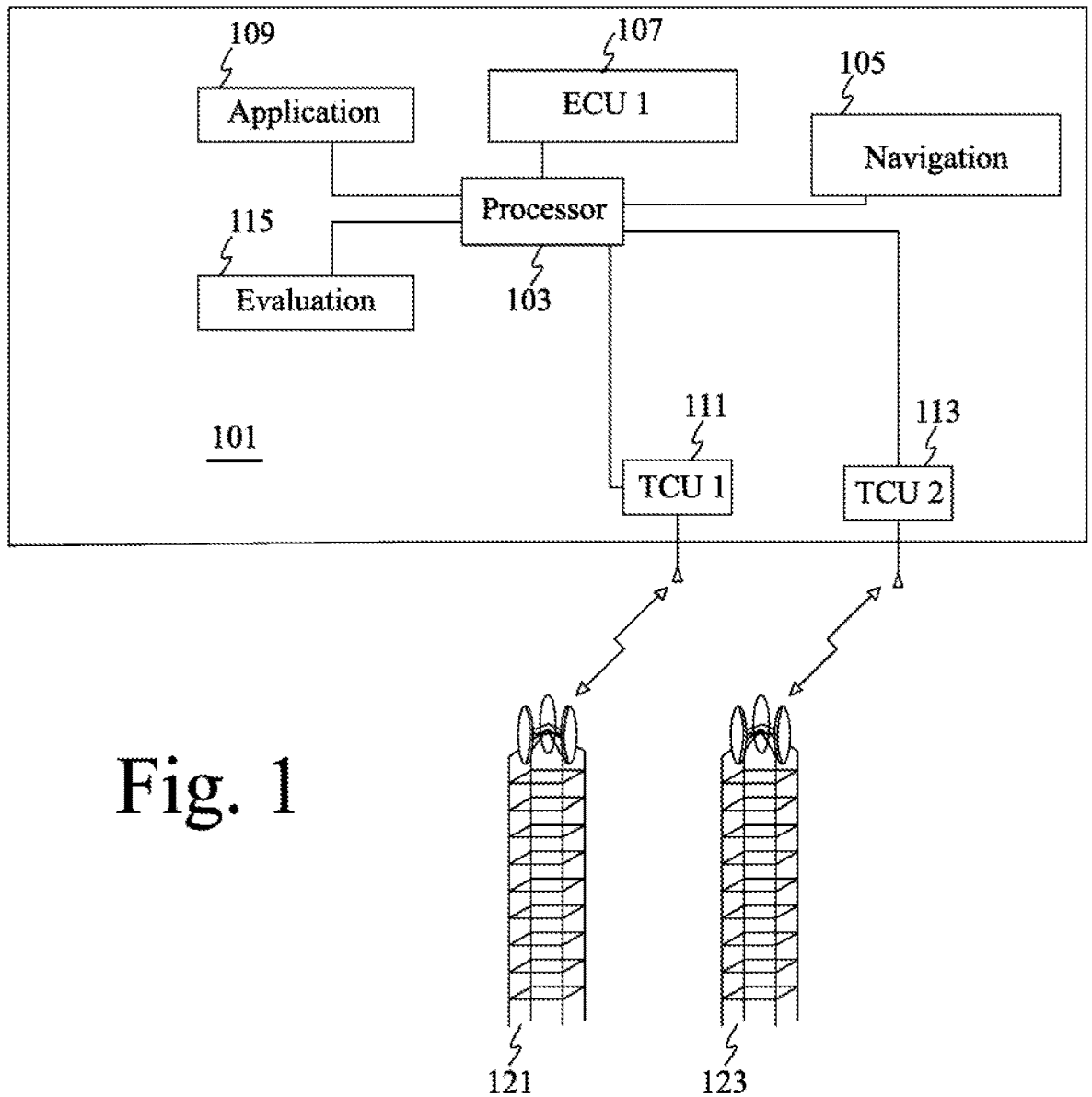
FIG. 1 shows an illustrative system for dual TCU operability.

FIG. 1 shows an illustrative system 100 for dual TCU operability. In this illustrative example, the vehicle 101 includes a processor 103 that may receive onboard data transfer requests for data onto and off of the vehicle 101. These requests may come from, for example, navigation unit 105, electronic control units (ECU1) 107, onboard applications 109 and a variety of other sources, including data requests coming from devices in wireless communication with the vehicle computer (e.g., the vehicle is responding to an application on a mobile device, not shown, or acting as a wireless hotspot).

Autonomous vehicles may require increased data transfer, and thus may include multiple TCUs, and in this example the vehicle 101 includes TCU1 111 and TCU2 113. Dual TCU solutions may also be included with non-autonomous vehicles, in order to handle data transfer requirements, preserve power and ensure wider ranges of coverage. For example, TCU1 111 may be serviced by carrier1 121, and TCU2 113 may be serviced by carrier2 123.

At any given time, carrier1 121 or carrier2 123 may provide the stronger signal, the use of which can preserve power over the use of a weaker signal. Poor signal strength can consume 3× or more as much power as strong signal strength when used for data transfer, and if the vehicle 101 is frequently transferring data, the constant drain on vehicle 101 power reserves can be mitigated by proper TCU usage.

By putting one TCU to sleep, other vehicle 101 systems may also sleep accordingly, which can save additional power when using a single TCU solution. Data control can be handed between TCU1 111 and TCU2 113 as needed to preserve power, and both TCUs 111, 113 can be used when maximizing transfer speed is preferred, or to save money by using the allocated data allotments when power is not an issue (e.g., when the vehicle 101 is charging).

The vehicle 101 may include an evaluation process 115, executed by the processor 103. This process 115 may consider power, data limits, required transfer speeds and other variables, as shown in the illustrative embodiments, when determining which TCU 111, 113 to use for a given request. The particular use of a TCU may be determined in accordance with manufacturer or user settings, which may allow either an original equipment manufacturer (OEM) or a vehicle owner to specify when power should be preferred over cost, etc. Certain critical functions, such as in AV scenarios where some data transfers may be legally mandated at maximum speeds, may not be user configurable, but in most instances the user may be able to personally configure preferred TCU usage scenarios.

In the instances where there is a legally mandated or user-defined minimum transfer speed, a data request may include an indicator of both or either. In other instances, a high-priority request may always be given preferential maximum speed treatment (e.g., select as many TCUs as are available). The vehicle 101 can choose which variable (of at least the power, data limits and transfer rules, for example) controls the decision making, and in some instances, as seen in examples herein, a secondary variable will control the decision based on which controlling variable is chosen. For example, without limitation, even if the vehicle 101 is not constrained by a transfer speed requirement or a power requirement so as to be required to maximize speed or minimize power usage, thus selecting the data limits as the controlling variable, the vehicle 101 may still consider power usage provided that neither TCU is above the maximum usage for a month and/or the usage of both is within a predefined ratio of each other.

The vehicle 101 can consider vehicle variables for control, responsive to a data transfer request, that include at least power usage constraints, data usage over a billing cycle for each carrier associated with a given TCU, and transfer timing requirements for a given data transfer request. All of these variables need not be considered, however, depending on a given implementation. Each variable may also have a value associated therewith, which can be, for example, a minimum transfer speed for transfer timing requirements, a current power level (or projected power level based on a input route) for power usage constraints, and/or data usage for each TCU over the current billing cycle for data usage as the controlling variable.

Thus, the vehicle 101 may consider a selection strategy for selecting a controlling variable, and then a choice strategy for choosing TCU(s) based on which variable controls and where the choice strategy is associated with the chosen controlling variable. That is, for example, the vehicle may select a controlling variable based on values associated with each variable, and then, based on which variable is selected, the vehicle 101 may choose one or more TCU(s) based on a strategy for choosing TCUs that is used when a given variable controls.

Figure 2:
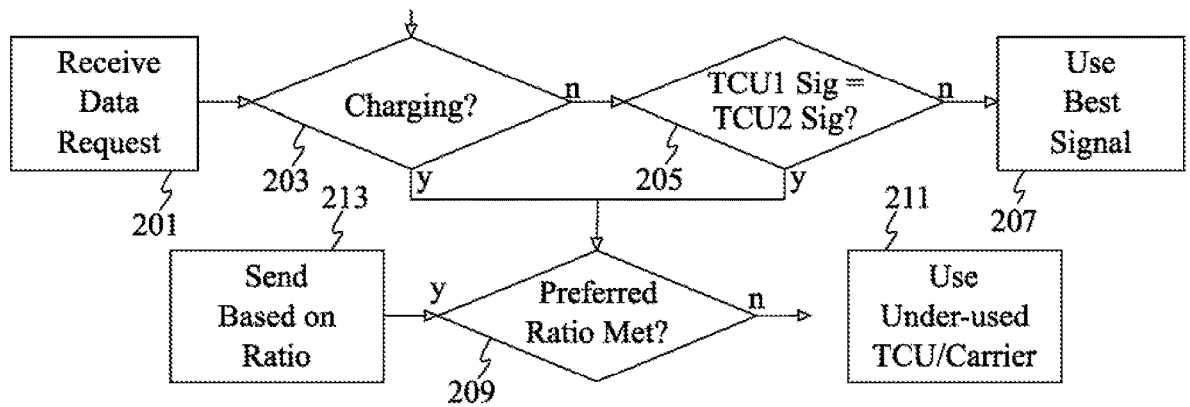
FIG. 2 shows an illustrative dual TCU scheduling process.

FIG. 2 shows an illustrative dual TCU scheduling process, which may be executable by a vehicle 101 processor 103. In this example, the vehicle 101 may receive a data request at 201 requiring usage of one or more TCUs 111, 113. Based on characteristics of the data request (speed, priority and other requirements) and current vehicle 101 states (power, data limits, TCU signal strengths and other states), the vehicle 101 may determine which TCU 111,113 or how to balance the load if both TCUs 111, 113 are used.

In this example, if the vehicle 101 is charging at 203, the vehicle 101 will use both TCUs 11, 113, as power usage will not be of particular concern. The user could always override this decision, if the vehicle 101 needed to be charged more quickly, but generally when the vehicle 101 is charging it need not consider the power usage of the TCUs 111, 113 when fulfilling requests.

If the vehicle 101 is not charging at 203, the vehicle 101 may consider power limitations as a factor. Assuming that dual TCU 111, 113 transfer is not required for speed purposes, the vehicle 101 determines at 205 which TCU 111, 113 has a greater signal strength at 205. In this example, the vehicle 101 uses the TCU 111, 113 with the best signal strength at 207. If that particular TCU is connected to a carrier whose data cap has been reached, the vehicle 101 may use the other TCU in order to preserve cost over power, as discussed later herein. The preference for saving money or power may be user dictated or may vary based on situations (e.g., save money over power, unless insufficient power to complete a planned route, or power below a threshold, remains, etc.).

In this example, there is a preferred ratio associated with TCU 111, 113 usage, based on, for example, relative data cost. That is, if TCU1 111 costs 4 cents per Mb and TCU2 113 costs 6 cents per MB, the system may generally tend to prefer TCU1 111 usage over TCU2 113 usage. At the same time, TCU2 113 data overages may only cost 7 cents per Mb and TCU1 111 data overages may cost 9 cents per Mb, so there is an incentive to not overuse TCU1 111 because of increased cost over cap and the fact that TCU1 111 usage might be required when TCU2 113 is unavailable. So, in this example, the vehicle 101 may use TCU1 111 for sixty percent of transfers, initially, and TCU2 113 for forty percent of transfers. As data caps are reached, or monthly limits are about to reset, this ratio can be changed to optimize cost, but it is difficult at the start of a cycle to predict exactly how much data will be used over the whole cycle.

If the vehicle 101 has been using TCU1 111 and TCU2 113 in accordance with a preferred ratio (e.g. 60/40 as noted) at 209, the vehicle 101 may continue to use that ratio at 213. Even if the ratio has changed based on other factors (data caps, cycle duration, etc), the vehicle 101 can generally know whether data usage has met the current preferred ratio at 209. If the preferred ratio is not met, for example, if the ratio has shifted to 80/20 in favor of TCU1 111, but the previous ratio of 60/40 was being met, the vehicle 101 can use the under-used TCU 111, 113 at 211 (in this example, TCU1 111) in order to bring the ratio in balance. Once the ratio is met, the vehicle 101 can resume using both TCUs 111, 113 when power is not of concern and the ratio is otherwise being met.

Figure 3:
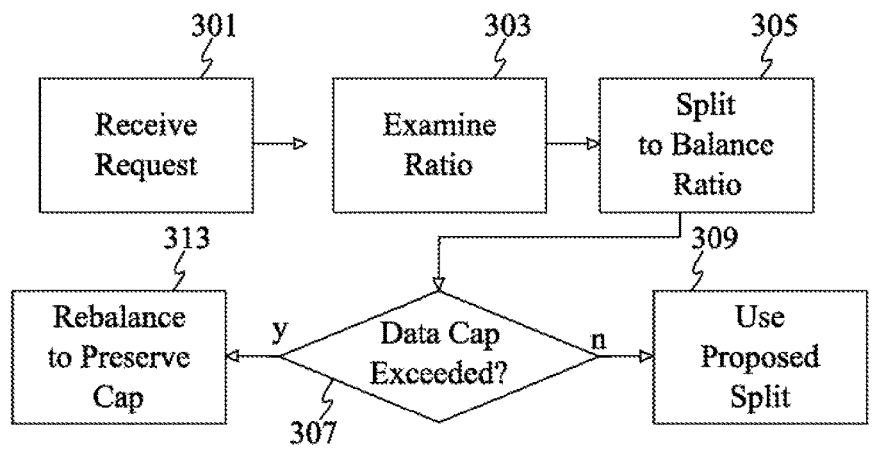
FIG. 3 shows an illustrative load balancing process.

FIG. 3 shows an illustrative load balancing process executable by, for example, a vehicle 101 processor 103. In this illustrative example, the vehicle 101 again receives a request for data transfer at 301. This process balances the load based on a secondary consideration of a data-cap associated with one or more carriers 121, 123, which can occur when large amounts of data have been transferred or near the end of a usage/billing cycle. As noted, each carrier 121, 123 may provide a predetermined amount of data on a cycle basis (e.g., monthly billing cycle). Typically, this cost is paid up front, so even if one carrier costs less per Mb than the other carrier (as in the preceding example), in many cases the vehicle 101 will simply try to exhaust the pre-paid data first, since it is already paid for in the monthly billing package. That is, even if the carrier2 123 data costs 6 cents per Mb and the carrier1 data costs 4 cents per Mb, if 4 Gb are prepaid for each, at that point the cost is effectively equal. If anything, the user would prefer to use the carrier2 123 data first, if the preceding billing model applied, because the overflow data from carrier2 123 in that model costs less than the overflow data from carrier1 121.

On the other hand, vehicle 101 data may be priced differently, and the user may actually pay for the individual amounts, with a cheaper cost allocated for the first X Gb and the additional cost associated with any overflow. The vehicle can adapt usage to however the carriers 121, 123 price data.

Assuming the user has prepaid for the first 4 Gb for each carrier 121, 123 in this example, the process may attempt to balance data usage 50/50 until a data-cap or billing cycle end approaches. If the two carriers are not on the same cycle, date-wise, the system may try to exhaust the 4 Gb associated with a given carrier 121, 123 before that carrier's cycle ends. Accordingly, based on factors of cost, time and data remaining, the vehicle 101 may examine the current ratio of usage at 303. The vehicle 101 may also have a preferred usage ratio at a given time, taking into account the preceding factors and the like, and thus the vehicle 101 may split data-transfer associated with the request in an attempt to more closely meet the current preferred ratio at 305.

At the same time, the vehicle 101 may further determine if the data-cap associated with either carrier 121, 123 is nearing or exceeded at 307. While exceeding the data-cap may be a reason to stop, the vehicle 101 may also act to preserve a few hundred Mbs of data for a given carrier 121, 123 until the last day or two of a cycle for that carrier 121, 123, in case the other carrier 121, 123 is not available at a given time and the vehicle 101 is required to use the carrier 121, 123 whose cap would otherwise be exceeded if the data had been exhausted. Thus, the vehicle 101 at 307 may consider if a cap is exceeded for a carrier 121, 123 or if an artificial cap, imposed by the vehicle 101, is exceeded (e.g. 95% of maximum data usage unless there are less than 2 days remaining in a billing cycle).

If the data cap is exceeded at 307, the vehicle 101 may rebalance a preferred balance established at 305, in order to preserve room under the data cap at 311. That is, the vehicle 101 could opt to use a single carrier 121, 123 or could use a higher ratio of a less-utilized carrier 121, 123 to preserve data for the more-utilized carrier 121, 123. If there is no concern about exceeding a current data cap, at 307, the vehicle 101 may use the split of data at 309 that was predetermined at 305.

Figure 4:
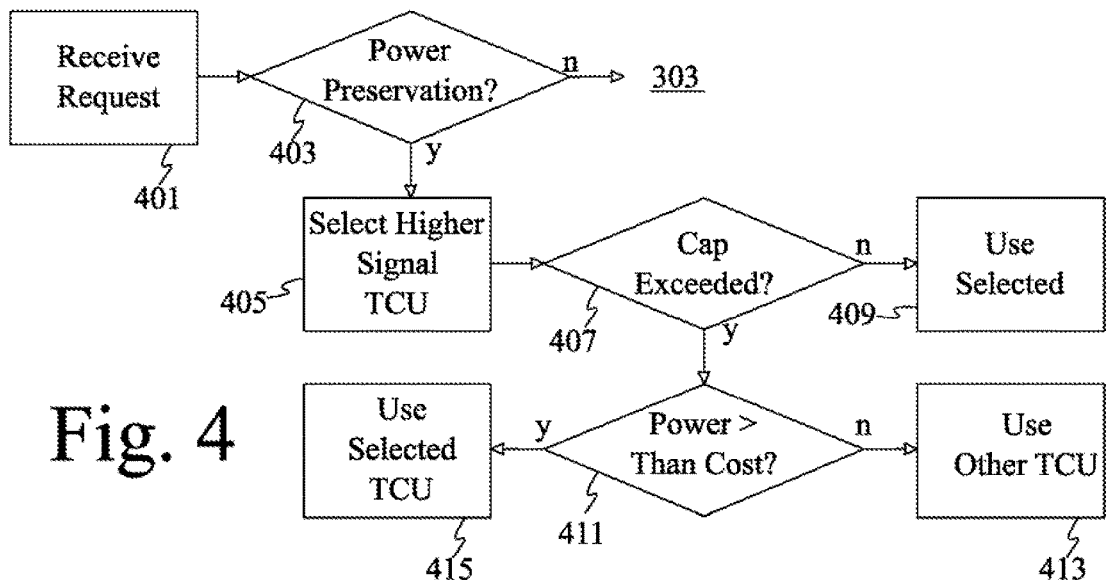
FIG. 4 shows an illustrative TCU selection process.

FIG. 4 shows an illustrative TCU selection process, executable by a vehicle 101 processor 103. In this illustrative example, the vehicle 101 receives a request for data transfer at 401. In addition to receiving requests originated at the vehicle 101, the TCUs 111, 113 may receive wake-up texts (SMS) or wake-up messages requesting TCU wakeup for incoming data. Whether a given TCU 111, 113 is woken in response to a request can be determined by the vehicle 101 in accordance with the illustrative embodiments. For example, even if a particular TCU 111, 113 receives the request, the vehicle 101 may elect to wake the other TCU 111, 113 to handle the request.

In this example, which may occur before the step 303 in FIG. 3, the vehicle 101 determines at 403 whether or not the vehicle 101 is in a power preservation state. The power preservation may exist because of user-specified constraints on power usage for a given ride, or because, for example, current power reserves may be insufficient to complete a planned route. If the vehicle 101 is not in a power preservation state at 403, the vehicle 101 may proceed to other considerations at 303, as described with respect to FIG. 3.

On the other hand, if the vehicle 101 is currently in a power preservation state, the vehicle 101 may initially select the TCU 111, 113 with the current highest signal strength at 405. This would be the preferred TCU 11, 113 in this example, because the higher signal strength will use less power in transferring the requested data. Note, in this example, at this point, the data balancing ratio is not the primary consideration, because the vehicle 101 is acting to preserve total power.

At the same time, the vehicle 101 may also consider at 407 whether the data-cap associated with the selected carrier 121, 123 has been exceeded. Given the sometimes excessive cost associated with exceeding data caps, the vehicle 101 here evaluates whether a data-cap associated with the selected carrier 121, 123 has been exceeded at 407. If the cap has not been exceeded at 407, then data-usage for a particular carrier 121, 123 is not a concern in this instance, and the vehicle 101 can proceed with using the selected carrier 121, 123 at 409.

If data usage is a concern, however, because the cap has been exceeded as determined at 407, the vehicle may then determine at 411 whether power-preservation is more important than cost. For example, if the vehicle is critically low on power, the user may not care about usage of slightly more expensive data in order to preserve power. On the other hand, if the user has simply requested power-minimization priority in an effort to remain "green," the user may be willing to temporarily forego that directive in the interest of avoiding excessive data overages. Thus, the user or OEM can specify when a particular factor trumps another factor.

If power preservation is paramount at 411, the vehicle 101 will use the selected carrier 121, 123 at 415, even though it was determined at 407 that the data cap for that carrier 121, 123 was exceeded. On the other hand, if the user prefers to save money for the current transfer and does not need the power preserved for any particular reason, the vehicle 101 may use the lower power signal determined at 405 that has the lower cost associated therewith, even though use of that signal will use more power.

Figure 5:
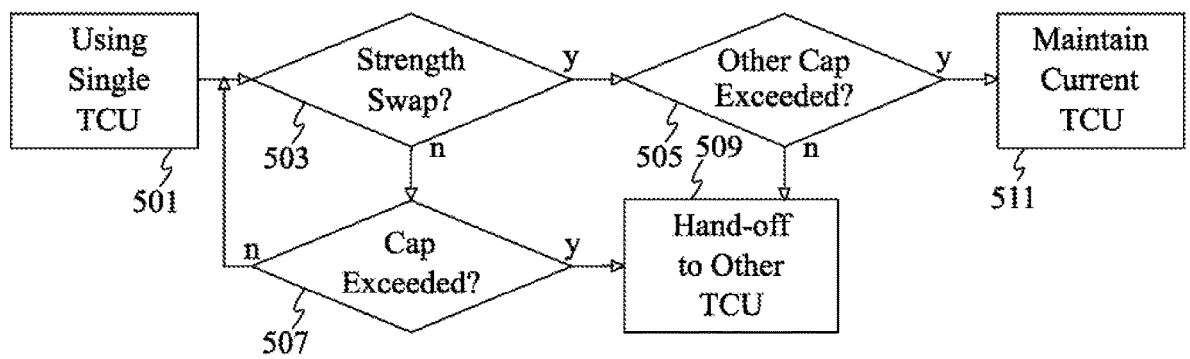
FIG. 5 shows an illustrative TCU handoff process.

FIG. 5 shows an illustrative TCU handoff process executable by a vehicle 101 processor 103. This handoff process illustrates dynamic load balancing between the TCUs 111, 113, which can accommodate data caps, signal strength changes, ratio adjustment, etc.

In this example, the vehicle 101 is currently using a particular TCU 111, 113 for an ongoing data transfer. At the same time, the vehicle 101 tracks the signal strength of all TCU 111, 113 connections, and recognizes at 503 that a signal strength of an unused TCU 111, 113 connection exceeds the strength of a currently used connection. Since it may require a certain amount of power to initiate and handle the handoff, the signal strength between the TCU 111, 113 connections may need to vary by more than a threshold, determined by the relative power cost of having the nowweaker TCU 111, 113 connection complete the transaction compared to the power cost of the handoff.

If the unused TCU 111, 113 connection's signal strength exceeds the in-use TCU 111, 113 connection signal strength by more than a threshold at 503, the vehicle 101 may determine at 505 if the data cap associated with the currently unused but stronger TCU 111,113 connection's designated carrier has been exceeded. If the cap is exceeded, the vehicle 101, in this example, may maintain the current connection, even though it uses more power, because of the lower cost. Again, if power preservation were paramount, in this example, the vehicle may alternatively automatically switch to the other TCU 111, 113 connection to preserve power despite cost.

If the signal strength of the current TCU 111, 113 connection at 503 is still higher, the vehicle 101 may also determine at 507 if the data cap for the current TCU 111, 113 carrier 121, 123 has been exceeded or is being approached. If the cap is not exceeded, the vehicle 101 may continue to use the current stronger TCU 111, 113 connection. If the cap of the current TCU 111, 113 connection's carrier 121,123 has been exceeded, the vehicle 101 may hand the connection off to the other TCU 111, 113 at 509. This same handoff may occur if the other TCU 111, 113 connection has a stronger signal and the other connection's carrier 121, 123 data cap has not yet been exceeded.

By dynamically and adaptively selecting and using the varied TCUs 111, 113 based on parameters associated with a current vehicle state, the duration and data remaining in a billing cycle, and signal strength of various carriers 121, 123 at any given time, the vehicle 101 can optimize TCU 111, 113 usage for data transfer in a way that maximizes resource preservation, be it power, time or cost, under any given scenario, and which is responsive to user and/or OEM constraints.

Programming instructions for executing illustrative embodiments and the like may be executed by suitable processors, including, but not limited to, vehicle processors, cloud processing and/or mobile device processors, depending on the variation of the examples. Non-transitory storage media, such as, but not limited to, hard disk drives, solid state drives and other storage media used to store programming instructions, may store instructions allowing processors accessing that storage media to execute the instructions to perform the illustrative embodiments and the like.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A method comprising:
   receiving a data transfer request at a vehicle;
   selecting a controlling vehicle variable based on a selection strategy prioritizing data transfer requirements included with the request, over both power usage considerations and data usage, and prioritizing power usage considerations over data usage;
   choosing one or more TCUs from a plurality of available TCUs to fulfil the request, based on a choice strategy associated with a controlling vehicle variable selected based on the selection strategy, wherein the choice strategy employs values of at least one vehicle variable not selected as the controlling vehicle variable; and
   using the chosen one or more TCUs to fulfil the request.

2. A vehicle comprising:
   a plurality of telematics control units (TCUs), at least two being provided service by different carriers; and
   a processor configured to
   consider vehicle variables, responsive to a data transfer request, including power usage constraints, data usage over a billing cycle for each carrier associated with a given TCU, and transfer timing requirements for a given data transfer request;
   select power usage constraints as a controlling variable value responsive to current power reserves being below a predefined threshold as indicated by a value of the power usage constraints variable;
   select at least one of the TCUs based on at least a value of the controlling variable; and
   use the selected TCU to fulfil the data transfer request.

3. The system of claim 2, wherein the processor is further configured to select one of the TCUs having a highest signal strength responsive to selecting power usage constraints as the controlling variable.

4. A vehicle comprising:
   a plurality of telematics control units (TCUs), at least two being provided service by different carriers; and
   a processor configured to
   consider vehicle variables, responsive to a data transfer request, including power usage constraints, data usage over a billing cycle for each carrier associated with a given TCU, and transfer timing requirements for a given data transfer request;
   select power usage constraints as a controlling variable value responsive to current power reserves being projected to fall below a predefined threshold value based on usage over a planned route currently input into the vehicle;
   select at least one of the TCUs based on at least a value of the controlling variable; and
   use the selected TCU to fulfil the data transfer request.

5. A vehicle comprising:
a plurality of telematics control units (TCUs), at least two being provided service by different carriers; and
a processor configured to
consider vehicle variables, responsive to a data transfer request, including power usage constraints, data usage over a billing cycle for each carrier associated with a given TCU, and transfer timing requirements for a given data transfer request;
select data usage over a billing cycle as a controlling variable value responsive to parameters for selecting power usage constraints and for selecting transfer timing requirements as the controlling variable not being met;
select at least one of the TCUs based on at least a value of the controlling variable; and
use the selected TCU to fulfil the data transfer request.

6. The system of claim 5, wherein the processor is further configured to select one of the TCUs having data usage, over a current billing cycle, below a predefined preferred ratio of TCU data usage as compared to at least one other TCU, responsive to selecting data usage over the current billing cycle as the controlling variable value.

7. The system of claim 5, wherein the processor is further configured to select one of the TCUs having data usage below a predefined preferred maximum data usage over a current billing cycle, responsive to selecting data usage over the current billing cycle as the controlling variable value.

8. The system of claim 5, wherein the processor is further configured to select a plurality of TCUs responsive to a current ratio of data usage by each of the selected plurality of TCUs compared to each other being within a predefined threshold variance of a predefined preferred ratio of TCU data usage.

9. The system of claim 5, wherein the processor is further configured to select a single TCU having a highest signal strength and data usage over a current billing cycle below a predefined preferred maximum responsive to a value of the power usage constraints variable being below a predefined threshold.

10. The system of claim 5, wherein the processor is further configured to select a single TCU having a lowest data usage over a current billing cycle responsive to a value of the power usage constraints variable being above a predefined threshold.

11. The system of claim 5, wherein the processor is further configured to select a single TCU having a lowest cost for data transfer when above a predefined preferred maximum over a billing cycle, responsive to all available TCUs having data usage above the predefined preferred maximum over a billing cycle associated with each respective TCU.

12. A vehicle comprising:
a plurality of telematics control units (TCUs), at least two being provided service by different carriers; and
a processor configured to
consider vehicle variables, responsive to a data transfer request, including power usage constraints, data usage over a billing cycle for each carrier associated with a given TCU, and transfer timing requirements for a given data transfer request;
select transfer timing requirements as the controlling variable responsive to the data transfer request including a mandated transfer speed and to select as many TCUs as are available, such that either all TCUs are selected or a total projected transfer speed of the selected TCUs is higher than the mandated transfer speed, responsive to selecting transfer timing requirements as the controlling variable value;
select at least one of the TCUs based on at least a value of the controlling variable; and
use the selected TCU to fulfil the data transfer request.

13. A method comprising:
receiving a data transfer request;
selecting a controlling vehicle variable, from at least:
power usage constraints, data usage over a billing cycle for each carrier associated with a given TCU, or transfer timing requirements for the data transfer request, wherein
the selecting selects transfer timing requirements responsive to the data transfer request includes a mandated transfer speed or an indicator of a high-priority request;
the selecting selects power usage constraints when not selecting transfer timing requirements and responsive to a power usage constraint variable value being below a predefined threshold; and
the selecting selects data usage over a billing cycle responsive to not selecting either of transfer timing requirements or power usage constraints; and
using one or more telematics control units (TCUs) of a plurality of onboard TCUs for usage to fulfil the data transfer request, the one or more TCUs chosen based on a value associated with the controlling vehicle variable.

14. The method of claim 13, wherein the one or more TCUs are chosen based on the chosen TCUs having projected data transfer speeds that aggregate to exceed the mandated transfer speed responsive to selecting transfer timing requirements as the controlling vehicle variable and the request including the mandated transfer speed.

15. The method of claim 13, wherein the one or more TCUs are chosen based on the chosen TCUs having projected data transfer speeds that aggregate to exceed a predefined required transfer speed associated with a high-priority request designation, responsive to selecting transfer timing requirements as the controlling vehicle variable and the request including the indicator of high-priority.

16. The method of claim 13, wherein one TCU is chosen based on a power usage constraint variable value indicating less than a predefined threshold of power reserves remaining and wherein the one TCU has a highest signal strength of all available of the plurality of onboard TCUs, responsive to selecting power usage constraints as the controlling vehicle variable.

17. The method of claim 13, wherein one TCU is chosen based on a power usage constraint variable value indicating less than a predefined threshold of power reserves projected to remain based on a current, defined route and wherein the one TCU has a highest signal strength of all available of the plurality of onboard TCUs, responsive to selecting power usage constraints as the controlling vehicle variable.

18. The method of claim 13, wherein one TCU is chosen based on a data usage variable value indicating that the chosen TCU has used the lowest ratio of data to a predefined preferred maximum data usage for that TCU, of all available TCUs and responsive to selecting data usage over a billing cycle being the controlling vehicle variable.

* * * * *